(12) United States Patent
Fukada

(10) Patent No.: US 8,751,692 B2
(45) Date of Patent: Jun. 10, 2014

(54) DATA TRANSFER APPARATUS, DATA TRANSFER METHOD, AND STORAGE MEDIUM

(71) Applicant: Canon Kabushiki Kaisha, Tokyo (JP)

(72) Inventor: Masanori Fukada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/633,519

(22) Filed: Oct. 2, 2012

(65) Prior Publication Data

US 2013/0103857 A1    Apr. 25, 2013

(30) Foreign Application Priority Data

Oct. 21, 2011  (JP) ................................. 2011-232119

(51) Int. Cl.
 G06F 13/38    (2006.01)
 G06F 13/00    (2006.01)
(52) U.S. Cl.
 USPC .............. 710/4; 710/2; 710/5; 710/8; 710/15; 710/22

(58) Field of Classification Search
 None
 See application file for complete search history.

(56) References Cited

U.S. PATENT DOCUMENTS

2008/0043750 A1    2/2008    Keels et al. .............. 370/395.52

FOREIGN PATENT DOCUMENTS

EP    1 378 837 A2    1/2004
JP    2001-167046 A    6/2001

*Primary Examiner* — Scott Sun
(74) *Attorney, Agent, or Firm* — Fitzpatrick, Cella, Harper & Scinto

(57) ABSTRACT

A data transfer apparatus includes an acquisition unit configured to acquire a first list indicating arrangement information of transfer source data, a second list indicating arrangement information of transfer destination data, a third list indicating arrangement information of data to be inserted, and a fourth list which includes a deletion offset address indicating a deletion start position and a data size of data to be deleted; a control unit configured to select a necessary list from the first to fourth lists, and generate data to be transferred from a transfer source to a transfer destination; and a transfer unit configured to transfer the data to the transfer destination.

14 Claims, 13 Drawing Sheets

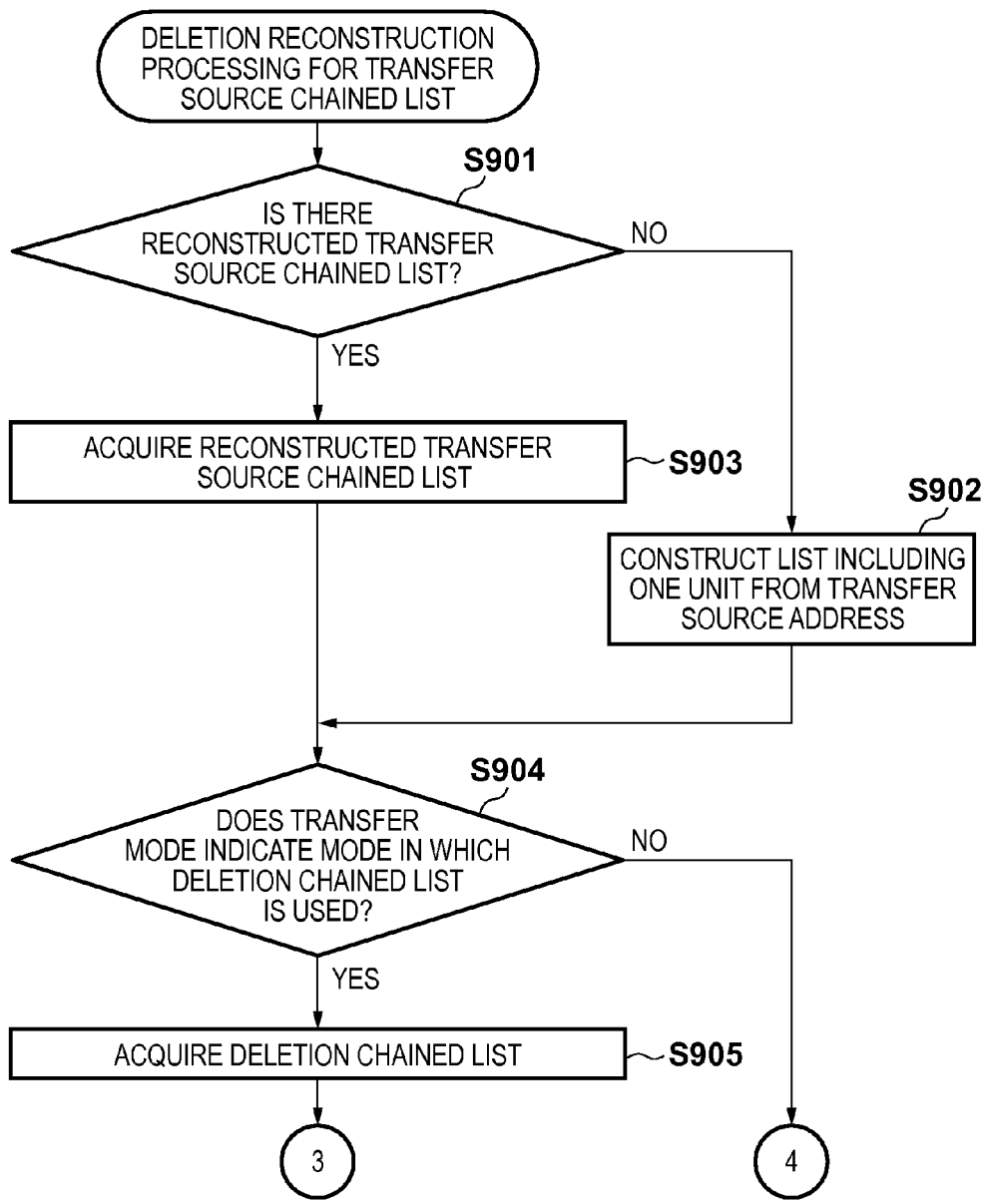
F I G. 9A

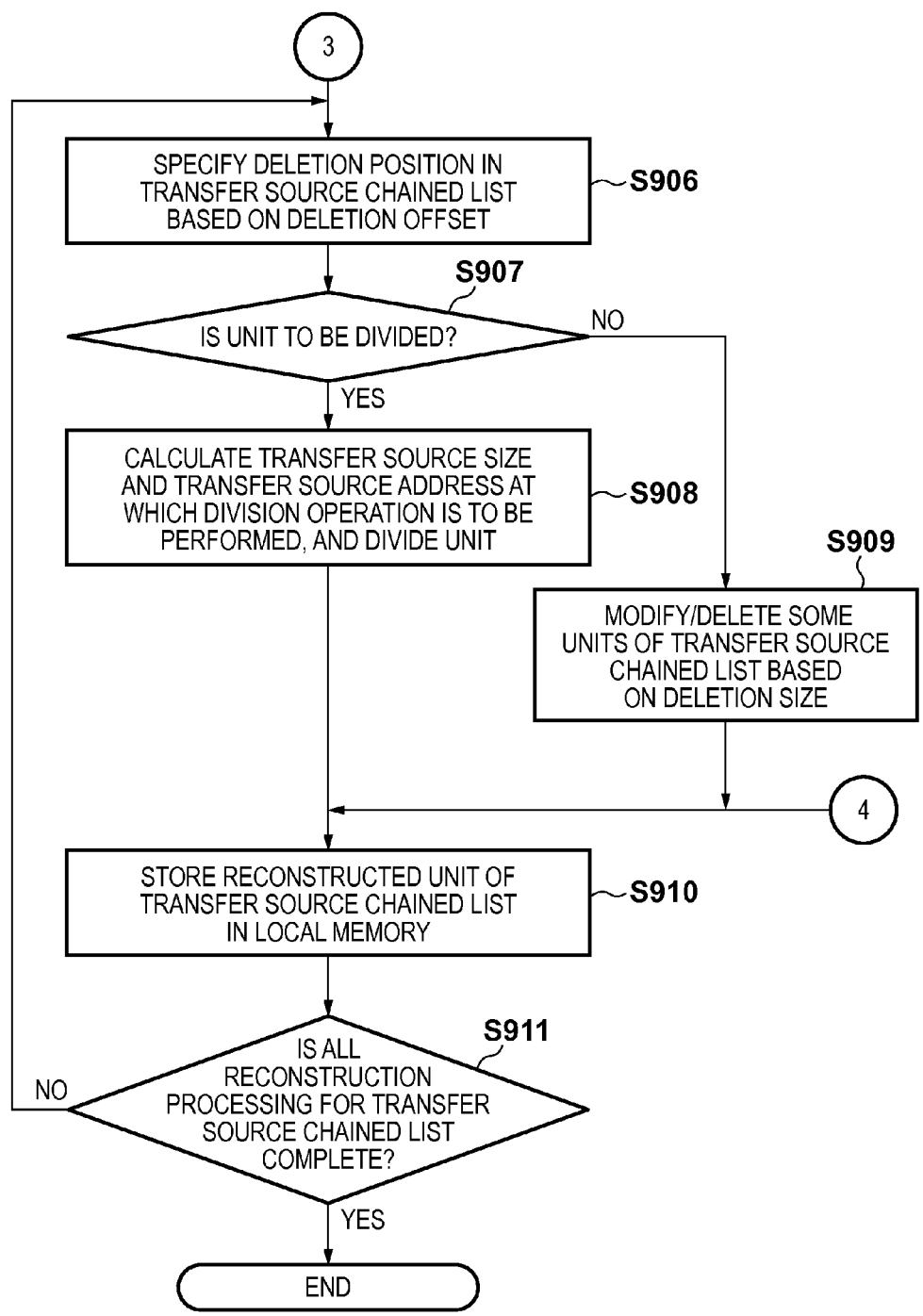

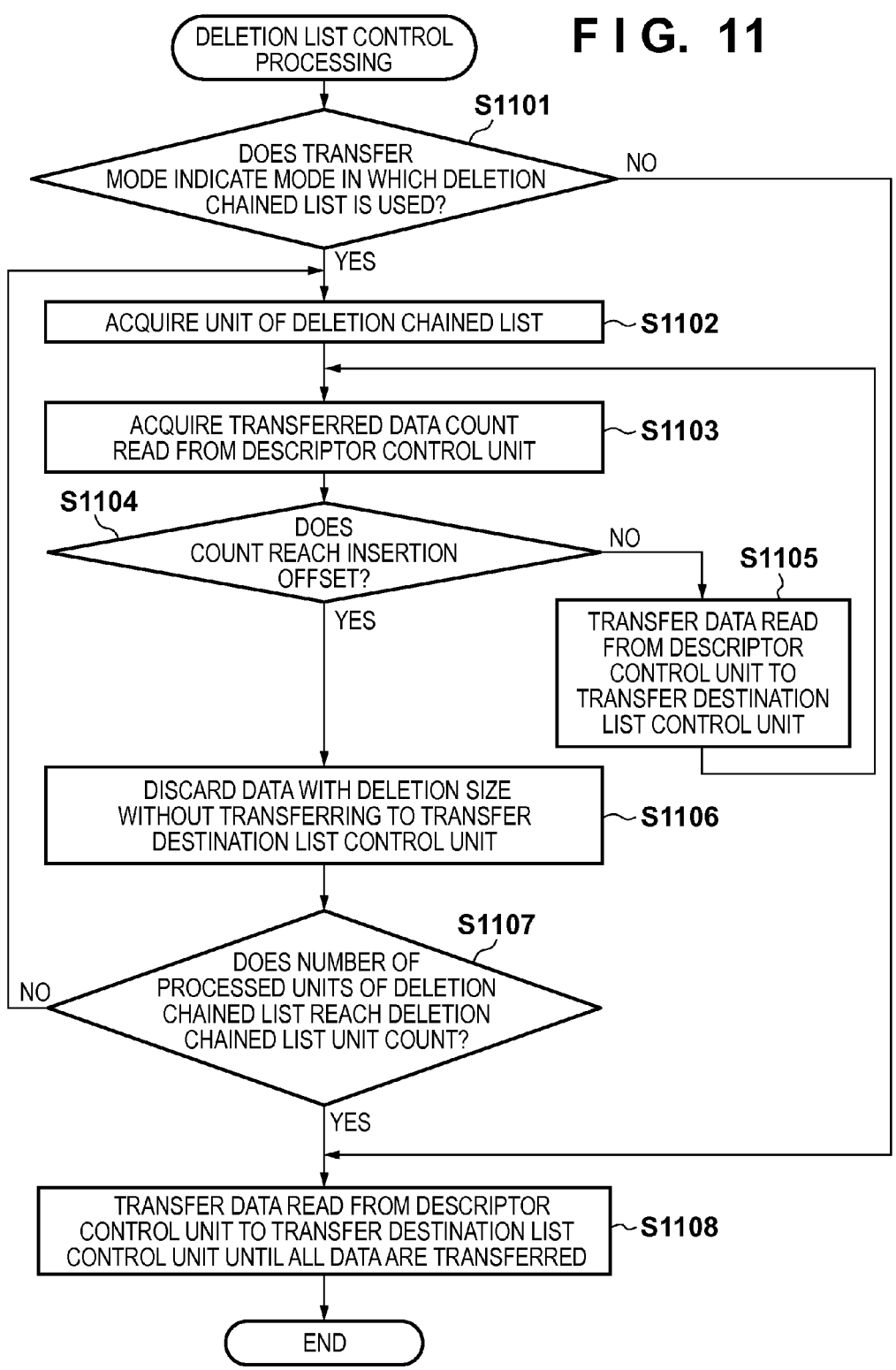

DATA TRANSFER APPARATUS, DATA TRANSFER METHOD, AND STORAGE MEDIUM

BACKGROUND OF THE INVENTION

1. Field of the Invention

The present invention relates to a data transfer apparatus which performs DMA (Direct Memory Access) transfer using chained lists, a data transfer method, and a storage medium.

2. Description of the Related Art

Since using a CPU to perform data transfer with a memory or a peripheral puts a heavy load on the CPU, it is a common practice to perform such data transfer using DMA. In the DMA transfer, in order to insert data at another address in the middle of continuous data to be transferred and then transfer the obtained data, it is necessary to transfer data before the insertion point, transfer data to be inserted, and then transfer data after the insertion point. For this purpose, the intervention of a main control unit such as a CPU is required to perform the series of data transfer operations. To solve this problem, Japanese Patent Laid-Open No. 2001-167046 proposes DMA in which only DMA processing is executed to insert data and transfer the obtained data without the intervention of a CPU by setting an insertion position and the like in advance.

There is also well known a DMA apparatus with a scatter/gather function in which when data to be transferred are discontinuously arranged, a chained list for a transfer operation is created in advance and a transfer operation is performed based on the created chained list.

On the other hand, in recent years, not only a general-purpose PC but also a built-in device has been required to execute various processes at high speed. However, the capacity of the processor of the built-in device is not enough to achieve the required performance only by processing by software in the main CPU. As a method of improving the processing performance by adding an auxiliary device, it is a common practice to implement some functions of a system as a sub-system. As described above, in a processing system which executes processing by offloading it from the main CPU to the sub-system, the main CPU generally executes the pre-processing and post-processing of the processing in the sub-system.

With respect to a chained list of transfer source data, a transfer destination buffer, and the like, which has been created in the main memory by the main CPU, the sub-system may perform scatter/gather transfer according to the chained list. In this case, as a result of the processing on the sub-system side, it may be necessary to insert data in the middle of data to be transferred. The method disclosed in Japanese Patent Laid-Open No. 2001-167046 is used for a DMA apparatus which inserts data in the middle of continuous data, and therefore has no effect when it is required to insert data in the middle of data which are discontinuously arranged and are formed by a chained list. That is, as in the conventional technique, it is necessary to perform a DMA transfer operation using a chained list several times, or to perform a DMA transfer operation by modifying a chained list. Since, however, the chained list needs to be arranged in a continuous area, and is arranged in a memory area managed by the main CPU, it is impossible to add or modify the chained list. It is, therefore, necessary to perform a DMA transfer operation by copying, to a memory area managed by the sub-system, the chained list created by the main CPU, and adding or modifying the chained list.

As a result of the processing in the sub-system for data acquired by itself from a device or the like, the sub-system may delete some data, and then pass the remaining data to the main CPU. In this case, it is necessary to modify the chained list used when the data is acquired from the device and then perform a transfer operation to a transfer destination buffer prepared by the main CPU, or to make a copy of the data itself to comply with the chained list, and then perform a transfer operation.

That is, it is impossible to use the created chained list intact when inserting or deleting part of data formed by the chained list. It is, therefore, necessary to re-create a chained list, or to make a copy of the data itself to comply with the chained list and arrange the obtained data. These operations are inefficient, and put a heavy load on the CPU.

SUMMARY OF THE INVENTION

The present invention has been made in consideration of the above-described problems, and provides a data transfer technique capable of transferring data in DMA transfer using chained lists while inserting or deleting transferred data at an arbitrary position.

According to one aspect of the present invention, there is provided a data transfer apparatus comprising: an acquisition unit configured to acquire a first list indicating arrangement information of transfer source data, a second list indicating arrangement information of transfer destination data, a third list indicating arrangement information of data to be inserted, and a fourth list which includes a deletion offset address indicating a deletion start position and a data size of data to be deleted; a control unit configured to select a necessary list from the first to fourth lists acquired by the acquisition unit, and generate data to be transferred from a transfer source to a transfer destination; and a transfer unit configured to transfer the data generated by the control unit to the transfer destination.

According to another aspect of the present invention, there is provided a data transfer method for a data transfer apparatus, comprising: an acquisition step of acquiring a first list indicating arrangement information of transfer source data, a second list indicating arrangement information of transfer destination data, a third list indicating arrangement information of data to be inserted, and a fourth list which includes a deletion offset address indicating a deletion start position and a data size of data to be deleted; a control step of selecting a necessary list from the first to fourth lists acquired in the acquisition step, and generating data to be transferred from a transfer source to a transfer destination; and a transfer step of transferring the data generated in the control step to the transfer destination.

According to still another aspect of the present invention, there is provided a non-transitory computer readable storage medium storing a program for causing a computer to execute a data transfer method comprising: an acquisition step of acquiring a first list indicating arrangement information of transfer source data, a second list indicating arrangement information of transfer destination data, a third list indicating arrangement information of data to be inserted, and a fourth list which includes a deletion offset address indicating a deletion start position and a data size of data to be deleted; a control step of selecting a necessary list from the first to fourth lists acquired in the acquisition step, and generating data to be transferred from a transfer source to a transfer destination; and a transfer step of transferring the data generated in the control step to the transfer destination.

According to the present invention, it is possible to transfer data in DMA transfer using chained lists while inserting or deleting transferred data at an arbitrary position.

It is possible to perform a transfer operation without the intervention of a main control unit such as a CPU in DMA processing, thereby reducing the load on the CPU. Since a chained list created in advance can be used intact, it is possible to reduce the load of the pre-processing of DMA transfer, which is executed by the main control unit, such as addition, modification, and making a copy of a chained list.

It is possible to perform DMA transfer by setting whether to use each list according to mode designation, thereby allowing general-purpose use.

Further features of the present invention will become apparent from the following description of exemplary embodiments (with reference to the attached drawings).

BRIEF DESCRIPTION OF THE DRAWINGS

FIGS. 9A and 9B are flowcharts for explaining reconstruction processing for a transfer destination chained list by the descriptor control unit according to the first embodiment;

FIG. 11 is a flowchart for explaining deletion control processing by a deletion list control unit according to the second embodiment.

DESCRIPTION OF THE EMBODIMENTS

First Embodiment

Figure 1:
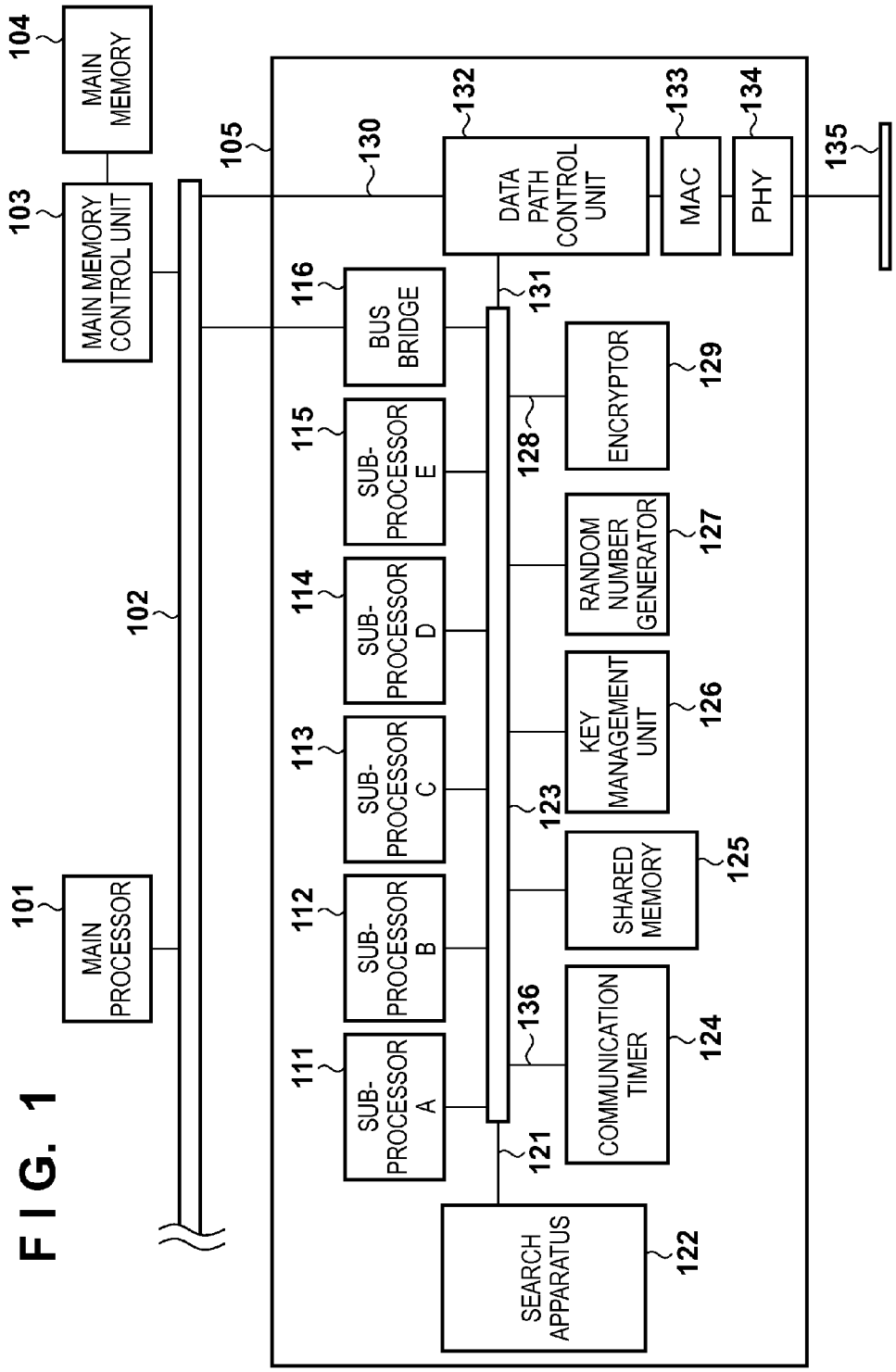
FIG. 1 is a block diagram showing the configuration of a TOE sub-system according to the first and second embodiments.
Figure 4:
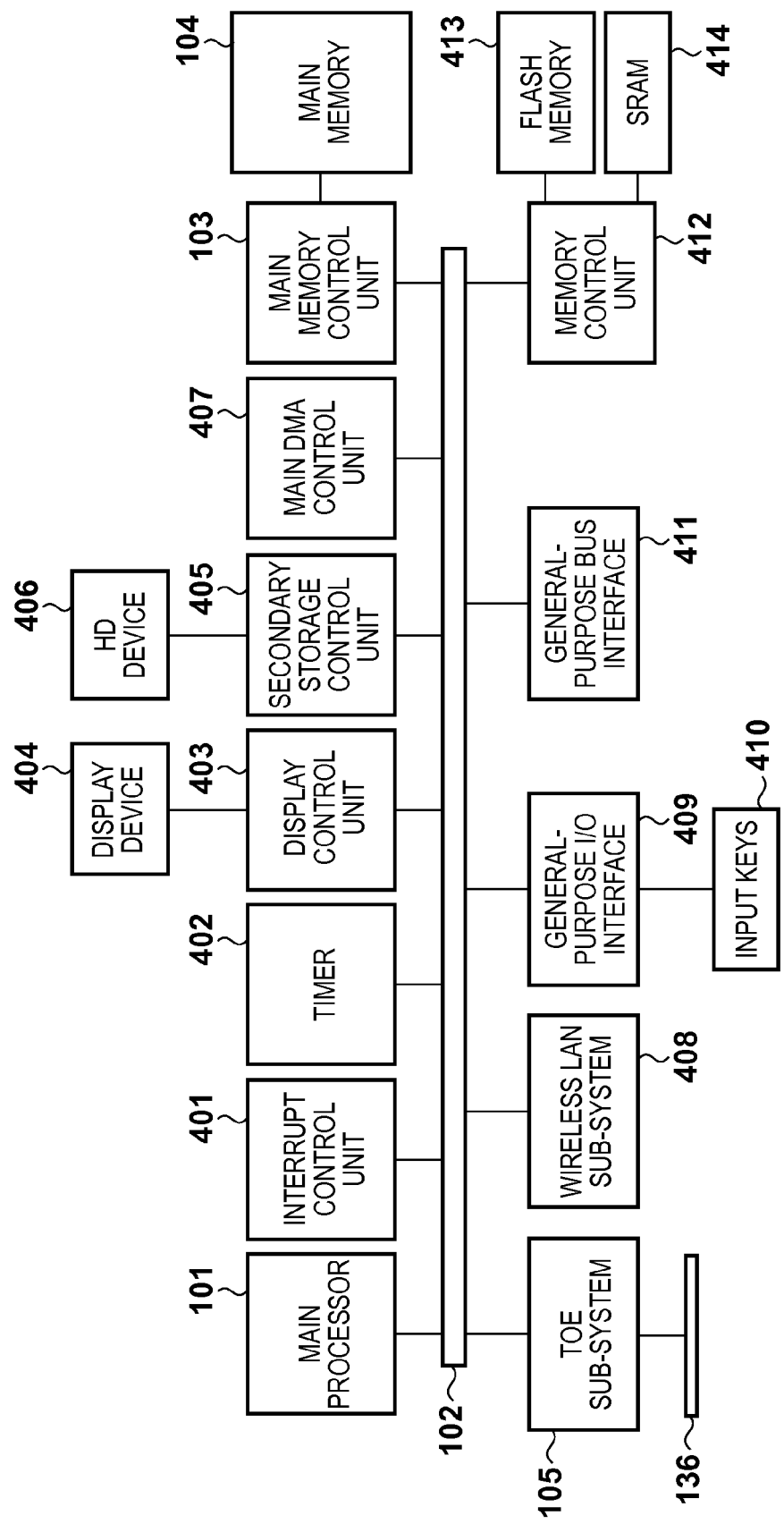
FIG. 4 is a block diagram showing an example of the configuration of a communication apparatus according to the first and second embodiments.

An example of the configuration of a communication apparatus including a TOE (TCP/IP Offload Engine) sub-system 105 which offloads communication processing will be described. A system bus 102 in FIG. 1 or 4 is an on-chip bus with a crossbar switch structure represented by the AMBA 3.0 AXI (Advanced eXtensible Interface) specification proposed by ARM in the UK. The system bus 102 can perform a transmission/reception data parallel transfer operation required by the communication apparatus. The TOE sub-system 105 is connected to the system bus 102 of the communication apparatus. The communication apparatus is connected to a network 135 via a PHY (Physical Layer Chip) 134 included in the TOE sub-system 105 (see FIG. 1).

An HD (Hard Disk) device 406 is connected to the system bus 102 via a secondary storage control unit 405 (see FIG. 4). The HD device 406 stores software for implementing the functions of the communication apparatus and its associated data, and firmware operating on a sub-processor within each sub-system and its associated data. The HD device 406 also stores history information such as the operation history and communication history of the communication apparatus. The software includes application software for implementing each function of the communication apparatus, an application protocol, a device driver for controlling associated hardware, and an OS (Operating System).

A flash memory 413 is connected to the system bus 102 via a memory control unit 412. The flash memory 413 is a rewritable non-volatile memory. The flash memory 413 stores a boot program which operates upon start of the communication apparatus, and parameters necessary for initial state setting of the communication apparatus. The flash memory 413 also stores a device driver program for controlling each hardware component upon start of the communication apparatus, setting parameters upon start of each hardware component, and the like.

A main processor 101, as a computer, of the communication apparatus executes the boot program within the flash memory 413. After initializing each hardware component and the sub-system of the communication apparatus, the main processor 101 loads the software stored in the HD device 406 into a main memory 104, and starts the OS included in the software. Upon initializing the sub-system, the main processor 101 expands firmware programs respectively executed by five sub-processors 111 to 115, that is, sub-processors A to E, incorporated in the TOE sub-system 105 on the main memory 104, and starts the sub-processors. Each of the sub-processors 111 to 115 loads, into an internal instruction cache memory, the firmware program expanded on the main memory 104, and executes it.

An interrupt control unit 401 which notifies the main processor 101 of an interrupt event from each hardware component or the TOE sub-system 105 is connected to the system bus 102 of the communication apparatus. The communication apparatus includes a timer 402 which is activated by software or the like, measures a time, and generates a time-out event. The communication apparatus also includes input keys 410 used to set the operation mode of the communication apparatus or to input each communication parameter represented by an IP (Internet Protocol) address. Furthermore, the communication apparatus includes a display device 404 which displays applications, the state and setting contents of the communication apparatus, and the like, and a wireless LAN sub-system 408 for connecting to a wireless LAN complying with the IEEE802.11a/b/g/n standard.

The TOE sub-system 105 includes a sub-system bus 123, which is connected to the system bus 102 via a bus bridge 116 (see FIG. 1). The sub-system bus 123 uses crossbar switch connection. The five sub-processors 111 to 115 incorporated in the TOE sub-system 105 are respectively connected to the sub-system bus 123. Multiprocessor processing by the sub-processors offloads TCP/IP protocol processing from a main system, and executes it at high speed.

Furthermore, the TOE sub-system 105 includes a communication unit for the sub-processor A 111 to the sub-processor E 115, a shared memory 125 for information sharing, and a communication timer 124 for measuring a time and generating a time-out event, which is necessary for the TCP/IP protocol processing. The TOE sub-system 105 also includes the PHY 134 and a MAC (Media Access Control) 133 for connecting to the network 135. The PHY 134 is hardware for dealing with electric signals and protocol processing in the PHY (physical) layer as the first layer of the OSI reference model. The MAC 133 is hardware for processing a protocol in a MAC layer corresponding to the lower sublayer of the data link layer (second layer) of the OSI reference model.

The TOE sub-system 105 includes a data path control unit 132 for DMA transferring reception packet data and transmission packet data between the MAC 133 and a memory device which is, for example, the main memory 104 or shared memory 125. The data path control unit 132 performs checksum calculation of the packet data during the transfer processing. The TOE sub-system 105 also includes a search apparatus 122 having an associative memory which stores various kinds of management information for the protocol processing and executes search processing.

The TOE sub-system 105 executes encryption communication protocol processing. An encryption communication protocol includes IPsec (Security Architecture for Internet Protocol). The TOE sub-system 105 also executes encryption communication protocol processing such as SSL (Secure Socket Layer) and TLS (Transport Layer Security). To do this, the TOE sub-system 105 includes a key management unit 126, a random number generator 127, and an encryptor 129. The key management unit 126 securely holds an encryption key generated for the encryption communication protocol processing, a random number, and a prime number. The random number generator 127 generates a random number necessary for encryption processing. The encryptor 129 of the TOE sub-system 105 includes the AES (advanced Encryption Standard) encryptor selected by the National Institute of Standards and Technology (NIST). The encryptor 129 also includes the SHA-1 (Secure Hash Algorithm 1) hash function used for authentication and digital signature, and the MD5 (Message Digest 5) hash function standardized as RFC 1321 by IETF or the like.

Example of Configuration of Data Path Control Unit 132

Figure 2:
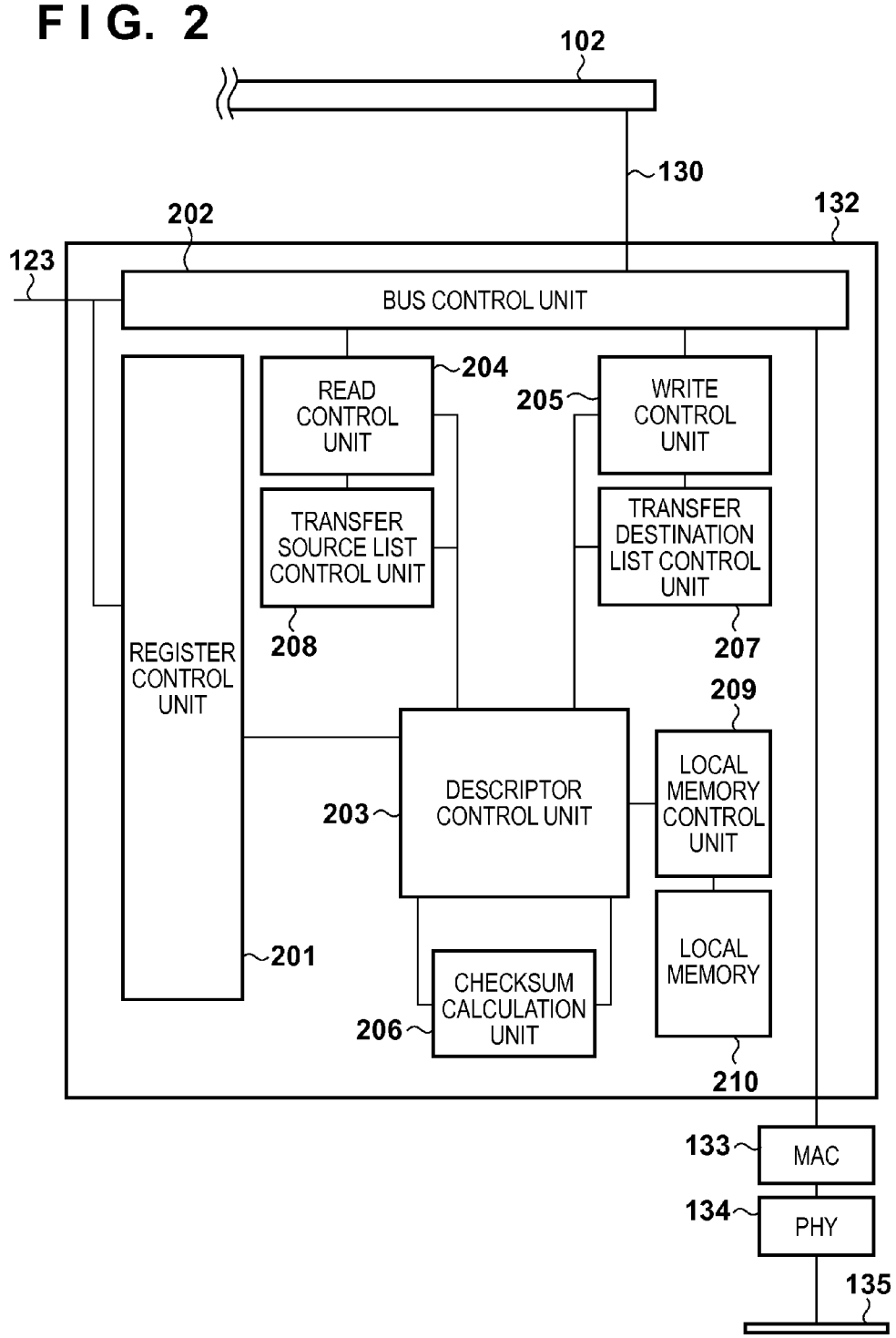
FIG. 2 is a block diagram for explaining the configuration of a data path control unit according to the first embodiment.

An example of the configuration of the data path control unit 132 included in the TOE sub-system 105 will be described. The data path control unit 132 of FIG. 2 is connected to the sub-system bus 123 of the TOE sub-system 105, the system bus 102 of the communication apparatus, and the MAC 133. The data path control unit 132 acquires a first list indicating the arrangement information of transfer source data, and a second list indicating the arrangement information of transfer destination data. The data path control unit 132 acquires a third list indicating the arrangement information of data to be inserted, and a fourth list including a deletion offset address indicating a deletion start position, and the data size of data to be deleted. The data path control unit 132 selects a necessary one of the acquired first to fourth lists according to a received transfer request, and generates data to be transferred from a transfer source to a transfer destination. The data path control unit 132 transfers the generated data to the transfer destination.

Figure 5:
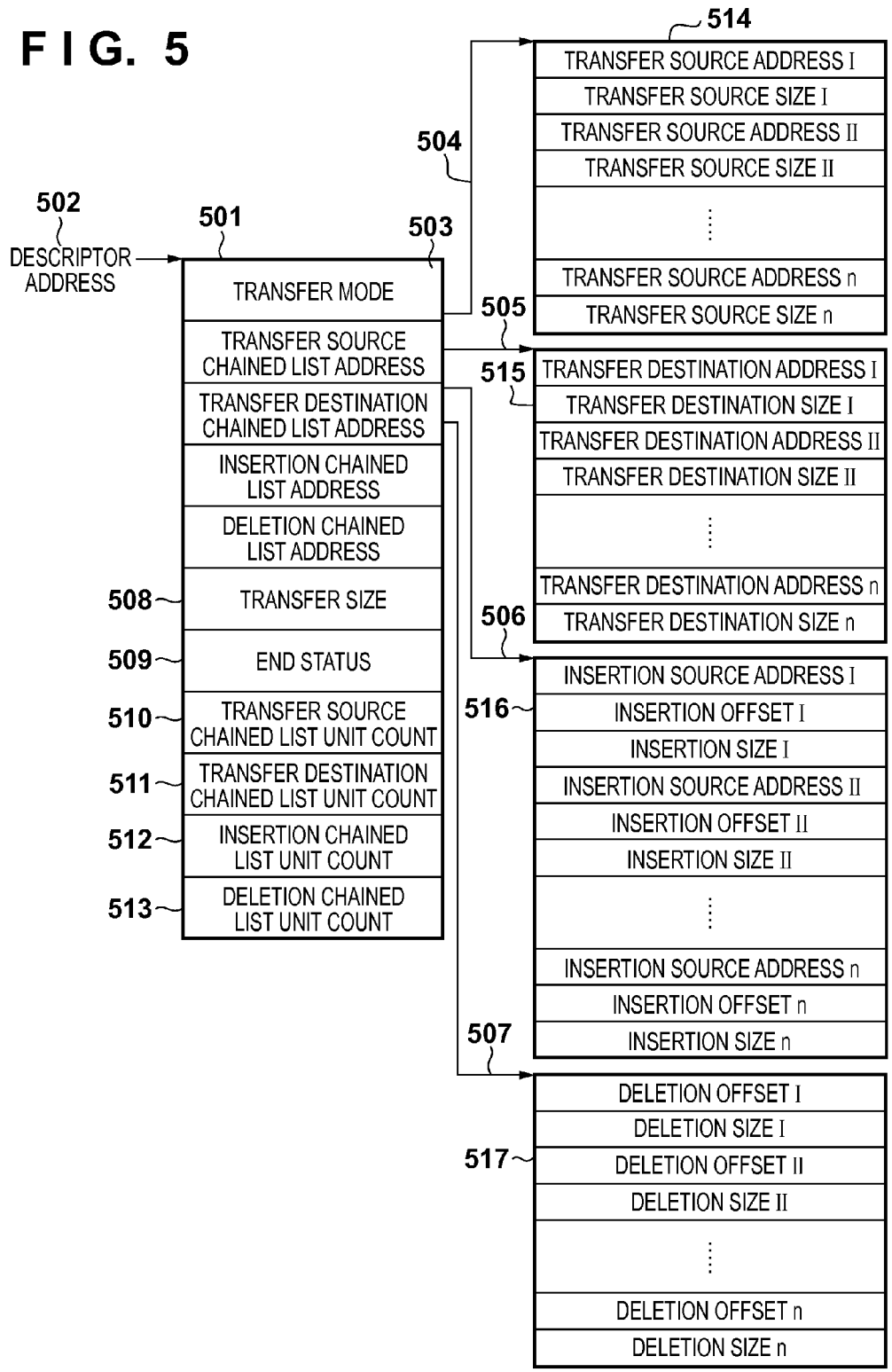
FIG. 5 is a view for explaining the configuration of a descriptor according to the first and second embodiments.

Upon receiving a request from each sub-processor and the main processor 101, the data path control unit 132 executes transfer processing between memories or between a device and a memory. At this time, each processor arranges a descriptor 501 shown in FIG. 5 in the shared memory 125 or main memory 104. The descriptor 501 is arranged in a continuous area. Furthermore, like the descriptor 501, chained lists to be used in a mode designated in a transfer mode 503 are arranged in the shared memory 125 or main memory 104. Each chained list is arranged in a continuous area.

By setting a descriptor address 502 in a register control unit 201 of the data path control unit 132, a transfer request is sent. Upon receiving the transfer request, the register control unit 201 notifies a descriptor control unit 203 of the descriptor address 502. The descriptor control unit 203 causes a read control unit 204 to execute processing of reading the descriptor 501. The read control unit 204 reads the descriptor 501 via a bus control unit 202. Upon start of the processing, the descriptor control unit 203 which has read the descriptor 501 acquires the respective lists at once according to the mode set in the transfer mode 503 of the descriptor 501. The descriptor control unit 203 can arbitrarily set according to the transfer mode 503 whether to use each of a transfer source chained list 514, a transfer destination chained list 515, an insertion chained list 516, and a deletion chained list 517.

If the transfer mode 503 is set to use the transfer source chained list 514 (first list), the data path control unit 132 acquires a list including units, the number of which is equal to a value set in a transfer source chained list unit count 510, from a transfer source chained list address 504 of the descriptor 501. The transfer source chained list 514 includes units, each unit consisting of an address at which transfer source data to be transferred is arranged (arrangement information indicating physically discontinuous address areas) and the size of data read from the address. On the other hand, if the transfer mode 503 is set not to use the transfer source chained list 514, a continuous area is read from the transfer source using, as a transfer source address, the address designated in the transfer source chained list address 504.

If the transfer mode 503 is set to use the transfer destination chained list 515 (second list), a list including units, the number of which is equal to a value set in a transfer destination chained list unit count 511, from the address of a transfer destination chained list address 505 of the descriptor 501 is acquired. The transfer destination chained list 515 includes units, each unit consisting of a transfer destination address at which data is arranged (arrangement information indicating physically discontinuous address areas) and the size of data to be written from the address. On the other hand, if the transfer mode 503 is set not to use the transfer destination chained list 515, a continuous area is written in the transfer destination using, as a transfer destination address, the address designated in the transfer destination chained list address 505.

If the transfer request includes data update designation, contents of the arrangement information of the first and second lists are reconstructed by contents of the update designation and the arrangement information of the first and second lists.

If the update designation indicates that the transfer mode 503 is set to use the insertion chained list 516 (third list), a list including units, the number of which is equal to a value set in an insertion chained list unit count 512, from the address of an insertion chained list address 506 is acquired. The insertion chained list 516 includes units, each unit consisting of an address at which data to be inserted is arranged, the size of the insertion source data to be transferred from the address, and an insertion offset address indicating an insertion start position for the transfer source data. On the other hand, if the transfer mode 503 is set not to use the insertion chained list 516, the field of the insertion chained list address 506 is ignored and a transfer operation involving insertion of data is not performed.

If the update designation indicates that the transfer mode 503 is set to use the deletion chained list 517 (fourth list), a list including units, the number of which is equal to a value set in a deletion chained list unit count 513, from the address of a deletion chained list address 507 is acquired. The deletion chained list 517 includes units, each unit consisting of a deletion offset address indicating a deletion start position, and the data size of data to be deleted from the deletion offset address. On the other hand, if the transfer mode 503 is set not to use the deletion chained list 517, the field of the deletion chained list address 507 is ignored and a transfer operation involving deletion of data is not performed.

The descriptor control unit 203 reconstructs (creates) a transfer source list and a transfer destination list based on each required list in a local memory 210. The descriptor control unit 203 accesses the local memory 210 via a local memory control unit 209.

The descriptor control unit 203 transfers data under the control of a transfer source list control unit 208 and a transfer destination list control unit 207 according to the lists created in the local memory 210, respectively. The transfer source list control unit 208 reads, via the read control unit 204, data with a designated size from an address indicated in the transfer source list. The read data is transferred to the transfer destination list control unit 207 via the descriptor control unit 203 and a checksum calculation unit 206. The checksum calculation unit 206 performs checksum calculation for the transferred data.

The transfer destination list control unit 207 writes, via a write control unit 205, the data with the designated size at an address indicated in the transfer destination list. The descriptor control unit 203 terminates the transfer processing upon reaching a size set in a transfer size 508 of the descriptor 501. Upon completion of the transfer processing, the checksum calculation result and the status of the transfer result are written in an end status 509.

In this embodiment, the above-described descriptor provides various setting parameters and chained lists to the data path control unit 132. The present invention is not limited to this, and any configuration is available as long as it is possible to provide information to the data path control unit 132.

Relationship Between Data Transfer Processing and Various Setting Parameters

Figure 6:
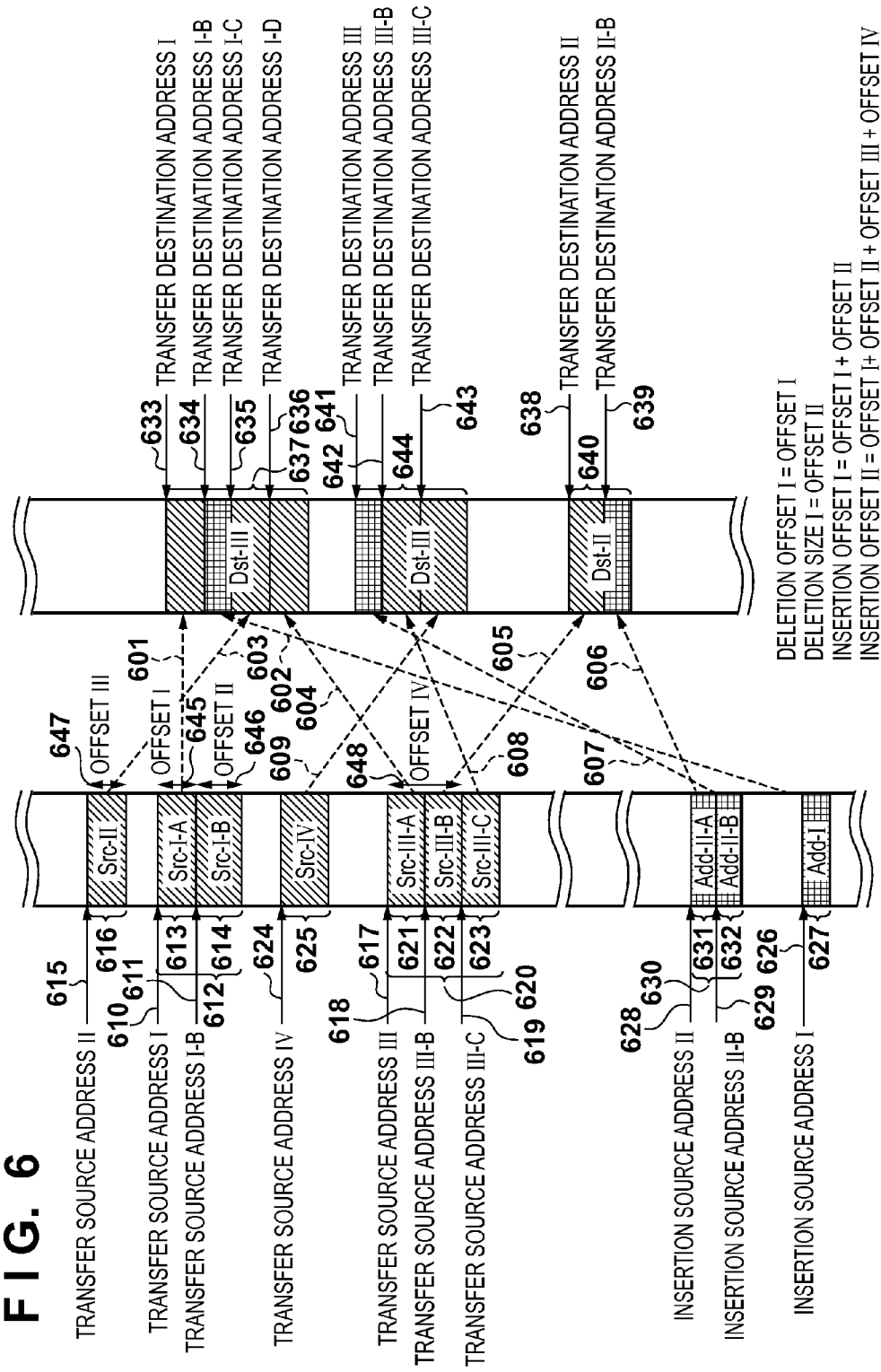
FIG. 6 is a view for explaining the relationship between various setting parameters and data transfer processing according to the first and second embodiments.

Data transfer processing will be exemplarily described with reference to FIG. 6, and the relationship between an address, size, and offset set in each list will also be explained. Assume in the data transfer processing in FIG. 6 that the transfer source chained list unit count 510 is four, the transfer destination chained list unit count 511 is three, the insertion chained list unit count 512 is two, and the deletion chained list unit count 513 is one.

The transfer source chained list 514 includes units, each of which consists of a transfer source address and a transfer source data size. The four units can include a transfer source address I 610 and a transfer source size I 612, a transfer source address II 615 and a transfer source size II 616, a transfer source address III 617 and a transfer source size III 620, and a transfer source address IV 624 and a transfer source size IV 625.

The transfer destination chained list 515 includes units, each of which consists of a transfer destination address and a transfer destination data size. The three units in the transfer destination chained list unit count 511 can include, for example, a transfer destination address I 633 and a transfer destination size I 637, a transfer destination address II 638 and a transfer destination size II 640, and a transfer destination address III 641 and a transfer destination size III 644.

The insertion chained list 516 includes units, each of which consists of an insertion source address, an insertion offset, and an insertion data size. The two units in the insertion chained list 516 can include, for example, an insertion source address I 626, an insertion offset I, and an insertion size I 627, and an insertion source address II 628, an insertion offset II, and an insertion size II 630. The insertion offset I indicates a value obtained by adding an offset I 645 and an offset II 646. The insertion offset II indicates a value obtained by adding the offset I 645, the offset II 646, an offset III 647, and an offset IV 648.

The deletion chained list 517 includes a unit of a deletion offset and a deletion data size. The one unit in the deletion chained list 517 can include a deletion offset I and a deletion size I. The deletion offset I is equal to the offset I 645, and the deletion size I is equal to the offset II 646.

The transfer size 508 indicates a value obtained by adding the transfer source size I 612, transfer source size II 616, transfer source size III 620, transfer source size IV 625, insertion size I 627, and insertion size II 630.

In the embodiment, a case in which the transfer size 508 is determined as described above and then a transfer operation is performed has been explained. Without considering the insertion sizes of the insertion chained list 516, the transfer size 508 may be a size read from the transfer source chained list 514. In this case, the transfer size 508 indicates a value obtained by adding the transfer source size I 612, transfer source size II 616, transfer source size III 620, and transfer source size IV 625.

The deletion size of the deletion chained list 517 may or may not be considered for the transfer size 508. That is, the transfer size 508 need only indicate a size such that the integrity is maintained in data transfer and processing is possible. In fact, it is desirable to set, in the transfer size 508, the size of data to be written.

When transfer processing starts with the above settings, data with a transfer source size I-A 613 is transferred from the transfer source address I 610 to the transfer destination address I 633, as indicated by a dotted arrow 601.

When the transfer size reaches the deletion offset I indicated by a value equal to the offset I 645, data with the deletion size I (offset II 646) of the data with the transfer source size I-A is discarded. That is, data with a transfer source size I-B 614 from a transfer source address I-B 611 in a transfer source area (Src-I-B) continuous to a transfer resource area (Src-I-A) is not written in the transfer destination.

When the transfer size reaches the insertion offset I indicated by the value obtained by adding the offset I 645 and offset II 646, data with the insertion size I 627 is transferred from the insertion source address I 626 to the transfer destination address I-B 634, as indicated by a dotted arrow 602. Then, data with the transfer source size II 616 is transferred from the transfer source address II 615 to a transfer destination address I-C 635, as indicated by a dotted arrow 603.

Data with a transfer source size III-A 621 is transferred from the transfer source address III 617 to a transfer destination address I-D 636, as indicated by a dotted arrow 604. Then, data with a transfer source size III-B 622 is transferred from a transfer source address III-B 618 to the transfer destination address II 638, as indicated by a dotted arrow 605.

When the transfer size reaches the insertion offset II (the total of offsets I, II, III, and IV), data with an insertion size II-A 631 is transferred from the insertion source address II 628 to a transfer destination address II-B 639, as indicated by a dotted arrow 606. After that, data with an insertion size II-B 632 is transferred from an insertion source address II-B 629 to the transfer destination address III 641, as indicated by a dotted arrow 607. Data with the transfer source size III-C 623 is transferred from a transfer source address III-C 619 to a transfer destination address III-B 642, as indicated by a dotted arrow 608. Then, data with the transfer source size IV 625 is transferred from the transfer source address IV 624 to a transfer destination address III-C 643, as indicated by a dotted arrow 609. Since the transferred data size reaches the transfer size 508 with the above transfer operations, the transfer processing ends.

Example of Setting of Each Chained List and Descriptor

Figure 7:
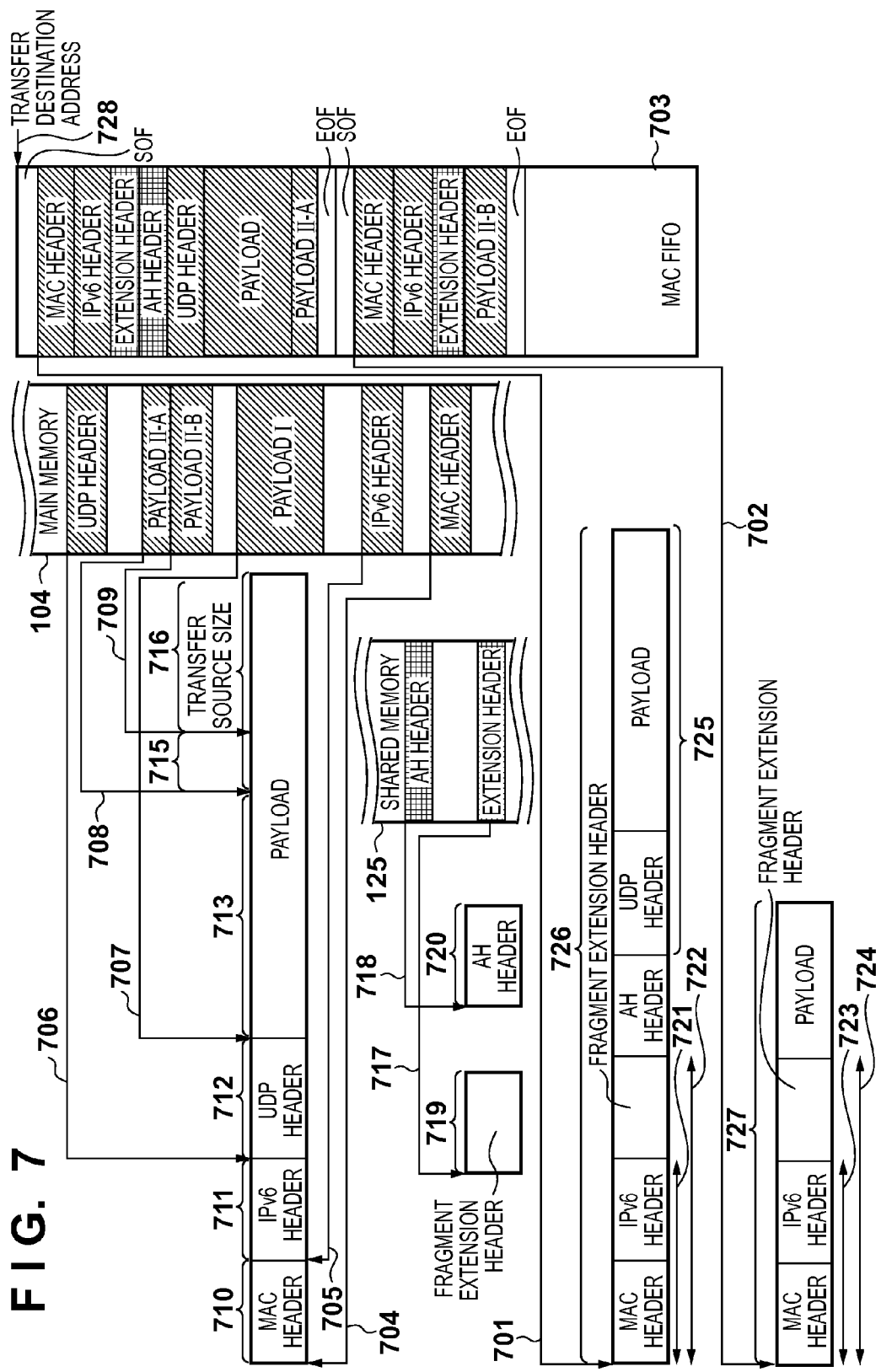
FIG. 7 is a view for explaining an example of setting of each chained list and a descriptor in packet transmission according to the first and second embodiments.

An example of setting of each chained list and a descriptor in packet transmission will be described with reference to FIG. 7. In FIG. 7, AH (Authentication Header) processing of IPsec (Security Architecture for Internet Protocol) is executed for a UDP datagram in IPv6. Processing when fragment processing is executed to transfer a packet to the FIFO of the MAC will be described. Note that in the transfer processing, two transfer processes are executed to transfer a first fragment and a second fragment.

The transmission data arranged by the main processor 101 is formed by a transfer source chained list in discontinuous areas of the main memory 104. Note that a MAC header, an Ipv6 header, and a UDP header which are incomplete are arranged in the main memory 104, and the processing by the sub-processors within the TOE sub-system 105 forms complete headers. The processing by each HW accelerator and the sub-processors of the TOE sub-system 105 executes IPsec processing.

If it is necessary to execute the AH processing as a result of searching security policy using the search apparatus 122, security association (SA) is also searched. Calculation of an integrity check value (ICV), or the like is performed using the key management unit 126 and encryptor 129, and the sub-processors form an AH header. After that, the sub-processors execute the fragment processing to form the fragment extension header. The AH header and fragment extension header are arranged in the shared memory 125. Note that if there is no processing of the TOE sub-system 105 when adding the IPsec processing and fragment processing, the transmission data arranged by the main processor 101 is sequentially transferred to an FIFO 703 of the MAC 133 intact. In FIG. 7, the AH header and fragment extension header arranged in the shared memory 125 are inserted in the transmission data arranged in the discontinuous areas of the main memory 104, and a first fragment packet is sequentially transferred to the FIFO 703 of the MAC 133. A packet indicated by a top 701 of the first packet is the first fragment packet. The fragment extension header is modified for a second fragment packet. Similarly, the fragment extension header arranged in the shared memory 125 is inserted in the transmission data arranged in the discontinuous areas of the main memory 104, and the UDP header and payload transferred in the first fragment packet are deleted, thereby sequentially transferring the second fragment packet. A packet indicated by a top 702 of the second packet is the second fragment packet. Upon transferring the packet to the FIFO 703 of the MAC 133, the MAC 133 inserts SOF (Start Of Frame) at the top of the packet and EOF (End Of Frame) at the end of the packet in the FIFO 703, for each data transfer process.

The descriptor and setting of each chained list in the first transfer operation for the first fragment packet or the second transfer operation for the second fragment packet will be described next.

The descriptor 501 and each chained list in the first transfer operation will be explained. The transfer mode 503 is set to use the transfer source chained list 514 and insertion chained list 516 and not to use the transfer destination chained list 515 or deletion chained list 517.

The transfer source chained list 514 consists of a transfer source address I, transfer source size I, transfer source address II, transfer source size II, transfer source address III, transfer source size III, transfer source address IV, transfer source size IV, transfer source address V, and transfer source size V.

The address of this chained list is set in the transfer source chained list address 504. A transfer source address I 704 indicates the top address of the MAC header; and the transfer source size I, the size of the MAC header. A transfer source address II 705 indicates the top address of the IPv6 header; and a transfer source size II 711, the size of the IPv6 header. A transfer source address III 706 indicates the top address of the UDP header; and a transfer source size III 712, the size of the UDP header. A transfer source address IV 707 indicates the top address of the payload; a transfer source address V 708, the address of a midpoint of the payload; and the sum of a transfer source size IV 713 and transfer source size V 714, the size of the payload.

A transfer destination address 728 as the address of the FIFO 703 of the MAC 133 is set in the transfer destination chained list address 505. The insertion chained list 516 consists of a first/second insertion source address I 717, a first insertion offset I 721, a first/second insertion size I 719, a first insertion source address II 718, the first insertion offset II 722, and a first insertion size II 720. The address of this chained list is set in the insertion chained list address 506. The first/second insertion source address I 717 indicates the top address of the fragment extension header; the first insertion offset I 721, a position at which the fragment extension header is inserted; and the first/second insertion size I 719, the size of the fragment extension header. The first insertion source address II 718 indicates the top address of the AH header; the first insertion offset I 721, a position at which the AH header is inserted; and the first insertion size II 720, the size of the AH header. Since the deletion chained list 517 is not used, nothing is set in the deletion chained list address 507. A first transfer size 726 is set in the transfer size 508. The first transfer size 726 indicates the total length of the first fragment packet. 5 is set in the transfer source chained list unit count 510, and nothing is set in the transfer destination chained list unit count 511. Furthermore, 2 is set in the insertion chained list unit count 512 and nothing is set in the deletion chained list unit count 513.

The descriptor 501 and each chained list in the second transfer operation will be described next. The transfer mode 503 is set to use the transfer source chained list 514, insertion chained list 516, and deletion chained list 517, and not to use the transfer destination chained list 515. The same settings as those in the first transfer operation are made for the transfer source chained list 514 and transfer source chained list address 504. Furthermore, the same setting as that in the first transfer operation is made for the transfer destination chained list address 505. The insertion chained list 516 consists of the first/second insertion source address I 717, a second insertion offset I 723, and the first/second insertion size I 719. The address of this chained list is set in the insertion chained list address 506. The first/second insertion source address I 717 indicates the top address of the fragment extension header; the second insertion offset I 723, a position at which the fragment extension header is inserted; and the first/second insertion size I 719, the size of the fragment extension header. The deletion chained list 517 consists of a second deletion offset I 724, and a second transfer size-B and second deletion size I 725. The address of this chained list is set in the deletion chained list address 507. The second deletion offset I 724 indicates the position of the payload of the second fragment packet; and the second transfer size-B and second deletion size I 725, the size of the payload transmitted in the first fragment. The sum of a second transfer size-A 727 and the second transfer size-B and second deletion size I 725 is set in the transfer size 508. The second transfer size-A 727 indicates the total length of the second fragment packet; and the second transfer size-B and second deletion size I 725, the size of a payload to be deleted based on the deletion chained list. 5 is set in the transfer source chained list unit count 510, and nothing is set in the transfer destination chained list unit count 511. Furthermore, 1 is set in the insertion chained list unit count 512, and 1 is set in the deletion chained list unit count 513.

Insertion Reconstruction Processing for Transfer Source Chained List

Figure 8A:
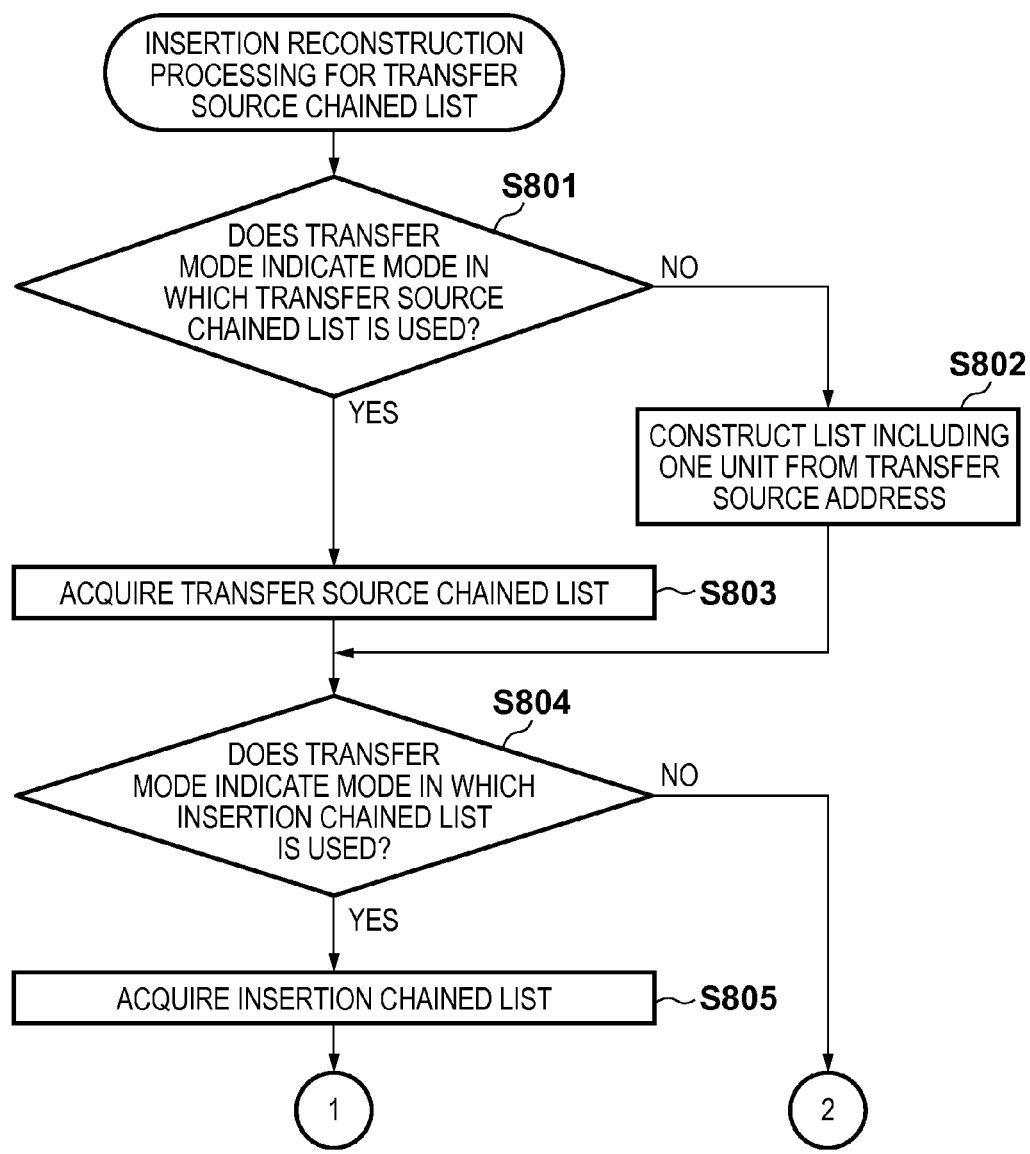
FIGS. 8A and 8B are flowcharts for explaining reconstruction processing for a transfer source chained list by a descriptor control unit according to the first embodiment.
Figure 8B:
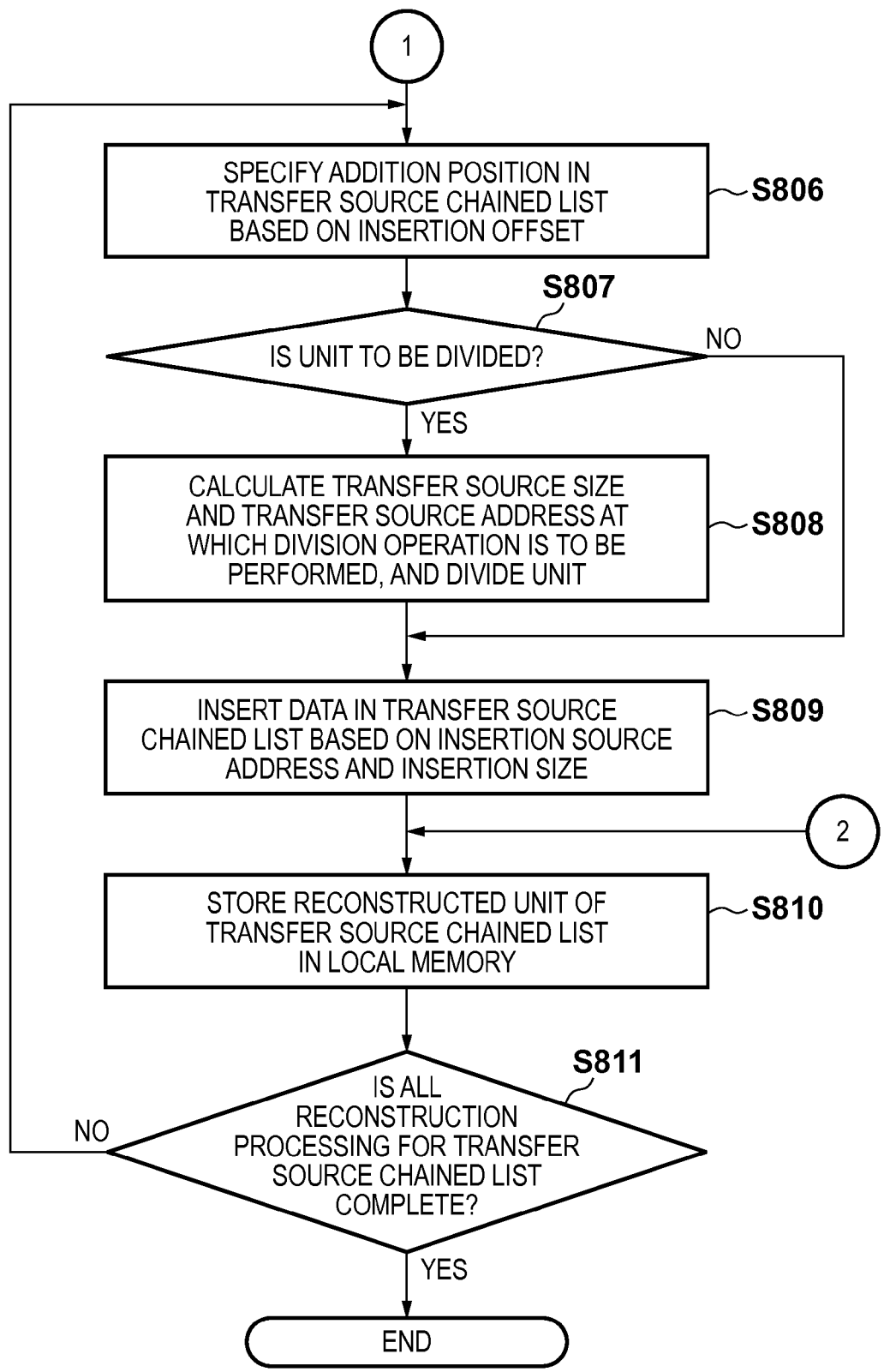

Insertion reconstruction processing for the transfer source chained list by the descriptor control unit 203 will be described. In step S801 of FIG. 8A, it is checked whether the transfer mode 503 set in the descriptor 501 indicates a mode in which the transfer source chained list 514 is used.

If it is determined in step S801 that the transfer mode 503 indicates a mode in which the transfer source chained list 514 is not used (NO in step S801), a transfer source chained list including one unit from a transfer source address is temporarily constructed in step S802. At this time, a transfer source size is not determined yet.

If it is determined in step S801 that the transfer mode 503 indicates a mode in which the transfer source chained list 514 is used (YES in step S801), the transfer source chained list 514 is acquired in step S803.

In step S804, it is checked whether the transfer mode 503 set in the descriptor 501 indicates a mode in which the insertion chained list 516 is used. If it is determined that the transfer mode 503 indicates a mode in which the insertion chained list 516 is not used (NO in step S804), the process advances to step S810.

If it is determined in step S804 that the transfer mode 503 indicates a mode in which the insertion chained list 516 is used (YES in step S804), the insertion chained list 516 is acquired in step S805.

In step S806, an insertion position of data to be added to the transfer source chained list is calculated and specified based on the insertion offset of the insertion chained list 516.

In step S807, it is checked whether a unit needs to be divided to insert the data at the position specified in step S806. If it is determined that no unit needs to be divided (NO in step S807), that is, if the data is inserted between units of the transfer source chained list, the process advances to step S809. If it is determined that one unit needs to be divided (YES in step S807), that is, if one unit is divided and a unit is inserted between the divided units, the process advances to step S808.

In step S808, the unit which has been determined to be divided in step S807 is divided. The transfer source address of the unit before the division operation is set as the transfer source address of the first divided unit, and a value calculated based on the insertion offset is set as a transfer source size. An address obtained by adding the first transfer size to the first transfer source address is set as the transfer source address of the second divided unit, and a value obtained by subtracting the transfer source size of the first divided unit from the transfer source size of the unit before the division operation is set as a transfer source size. On the other hand, if the transfer mode 503 indicates a mode in which the transfer source chained list 514 is not used, the transfer size 508 is used as the transfer source size of the unit before the division operation.

In step S809, the unit is inserted at the position specified in step S806 in the transfer source chained list 514. The insertion source address is set as the transfer source address of the unit to be inserted, and the insertion size is set as a transfer source size.

In step S810, the reconstructed unit of the transfer source chained list is stored.

In step S811, it is checked whether all the reconstruction processing for the transfer source chained list is complete. If it is determined that not all the reconstruction processing is complete (NO in step S811), the process advances to step S806 to repeat the processing in steps S806 to S810. If it is determined that all the reconstruction processing is complete (YES in step S811), the insertion reconstruction processing for the transfer source chained list ends.

Although the transfer source chained list is reconstructed according to the above-described procedure in this embodiment, any reconstruction procedure is available as long as the integrity between the transfer source chained list and the insertion chained list is maintained.

Deletion Reconstruction Processing for Transfer Source Chained List

Deletion reconstruction processing for the transfer source chained list by the descriptor control unit 203 will be described. In step S901 of FIG. 9A, it is checked whether there is a reconstructed transfer source chained list.

If it is determined in step S901 that there is no reconstructed transfer source chained list (NO in step S901), a transfer source chained list including one unit from the transfer source address is temporarily constructed in step S902. At this time, a transfer source size is not determined yet.

If it is determined in step S901 that there is a reconstructed transfer source chained list (YES in step S901), it is acquired in step S903.

In step S904, it is checked whether the transfer mode 503 set in the descriptor 501 indicates a mode in which the deletion chained list 517 is used. If it is determined that the transfer mode 503 indicates a mode in which the deletion chained list 517 is not used (NO in step S904), the process advances to step S910.

If it is determined in step S904 that the transfer mode 503 indicates a mode in which the deletion chained list 517 is used (YES in step S904), the deletion chained list 517 is acquired in step S905.

In step S906, a deletion start position (deletion position) in the transfer source chained list is calculated and specified based on the deletion offset of the deletion chained list 517.

In step S907, it is checked whether a unit needs to be divided by performing a deletion operation at the position specified in step S906. If it is determined that no unit needs to be divided (NO in step S907), data with a predetermined size from the deletion offset address at which a deletion operation starts is deleted to modify the transfer source chained list (step S909). If it is determined that a unit needs to be divided (YES in step S907), that is, if one unit area is divided into discontinuous areas by the deletion operation, the process advances to step S908.

In step S908, the unit which has been determined to be divided in step S907 is divided. The transfer source address of the unit before the division operation is set as the transfer source address of the first divided unit, and a value calculated based on the deletion offset is set as a transfer source size. An address obtained by adding the first transfer size and the deletion size to the first transfer source address is set as the transfer source address of the second divided unit. A value obtained by subtracting the transfer source size of the first divided unit and the deletion size from the transfer source size of the unit before the division operation is set as a transfer source size. If there is no reconstructed transfer source chained list, the transfer size 508 is used as the transfer source size of the unit before the division operation.

In step S909, some units of the transfer source chained list are modified/deleted since a deletion operation starts at the position, specified in step S906, of the transfer source chained list. If the transfer source chained list is traced from the position specified in step S906 by the deletion size, and an area with the transfer source size from the transfer source address of one unit is included in an area with the deletion size, the unit is deleted. If an area after the area with the transfer source size from the transfer source address of one unit is included in the area with the deletion size, the transfer source address remains unchanged, and the size of the included portion is subtracted from the transfer source size to set the obtained value. If an area before the area with the transfer source size from the transfer source address of one unit is included in the area with the deletion size, the address of a portion not to be deleted is calculated and set as the transfer source address, and the size of the included portion is subtracted from the transfer source size to set the obtained value.

In step S910, the reconstructed unit of the transfer chained list is stored.

In step S911, it is checked whether all the reconstruction processing for the transfer source chained list is complete. If it is determined that not all the reconstruction processing is complete (NO in step S911), the process advances to step S906 to repeat the processing in steps S906 to S910. If it is determined that all the reconstruction processing is complete, the deletion reconstruction processing for the transfer source chained list ends.

Although the transfer source chained list is reconstructed according to the above-described procedure in this embodiment, any reconstruction procedure is available as long as the integrity between the transfer source chained list and the deletion chained list is maintained.

According to this embodiment, the data path control unit can reconstruct, as the pre-processing of transfer processing, the transfer source list using the insertion chained list and deletion chained list without the intervention of the processor. This enables to perform a transfer operation while inserting or deleting transferred data at an arbitrary position in DMA transfer using chained lists, and also enables to perform a transfer operation without the intervention of the processor during DMA processing, thereby reducing the load on the processor. Since a chained list created in advance can be used intact, it is possible to reduce the load of the pre-processing of DMA transfer, which is executed by the processor, such as addition, modification, and making a copy of the chained list. It is possible to arbitrarily combine chained lists to be used according to a transfer mode, thereby allowing general-purpose use.

Second Embodiment

An example of the configuration of a data path control unit 132 included in a TOE sub-system 105 according to the second embodiment will be described. FIGS. 1, 4, 5, 6 and 7 are views in common with the first embodiment, and a description thereof will be omitted.

Figure 3:
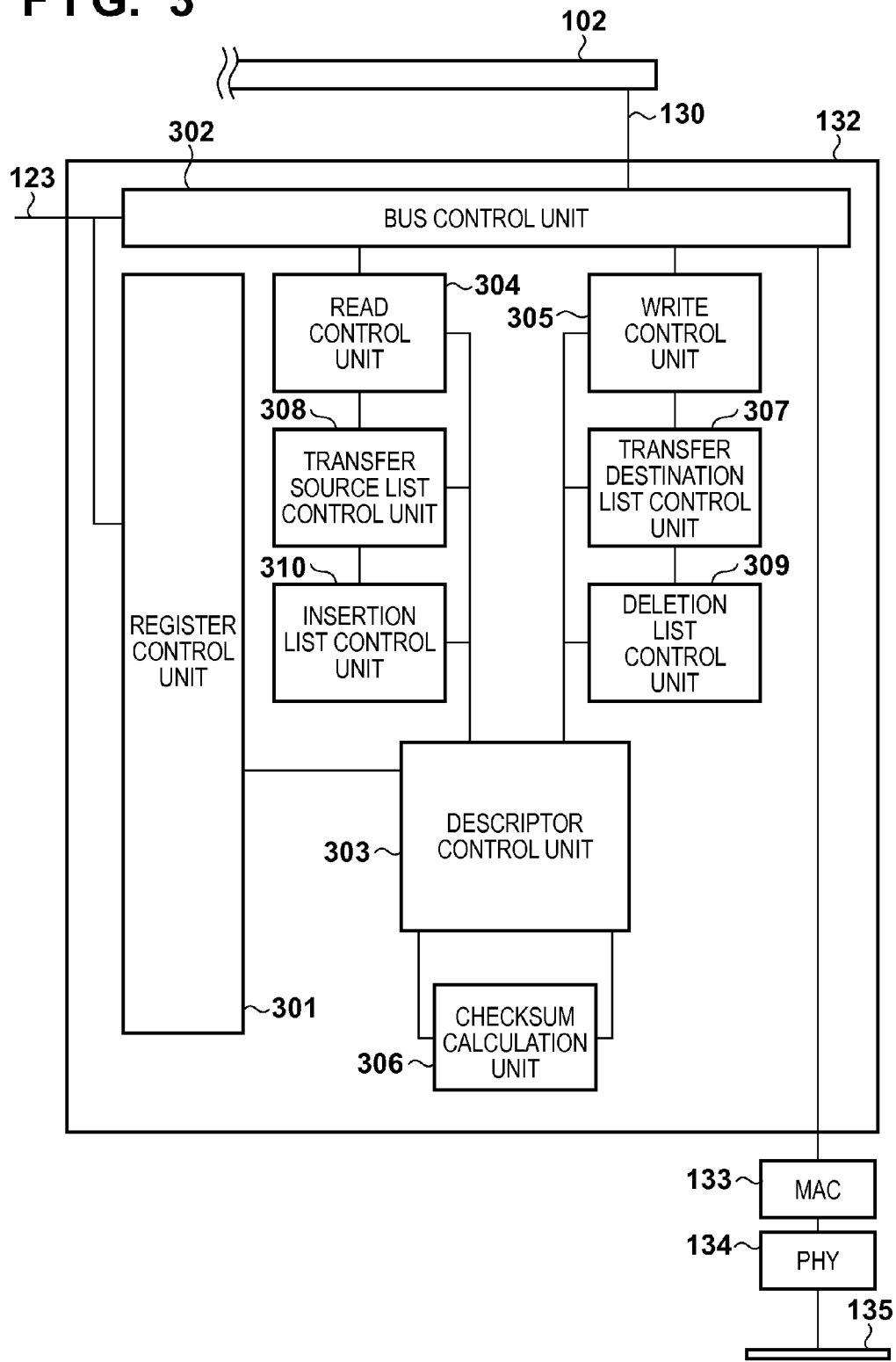
FIG. 3 is a block diagram for explaining the configuration of a data path control unit according to the second embodiment.

The data path control unit 132 of FIG. 3 is connected to a sub-system bus 123 of the TOE sub-system 105, a system bus 102 of a communication apparatus, and a MAC 133.

Upon receiving a request from each sub-processor and a main processor 101, the data path control unit 132 executes transfer processing between memories or between a device and a memory. At this time, each processor arranges a descriptor 501 shown in FIG. 5 in a shared memory 125 or main memory 104. The descriptor 501 is arranged in a continuous area. Furthermore, like the descriptor 501, chained lists to be used in a mode designated in a transfer mode 503 are arranged in the shared memory 125 or main memory 104. Each chained list is arranged in a continuous area.

By setting a descriptor address 502 in the register control unit 301 of the data path control unit 132, a transfer request is sent. Upon accepting the transfer request, the register control unit 301 notifies a descriptor control unit 303 of the descriptor address 502. The descriptor control unit 303 causes a read control unit 304 to execute processing of reading the descriptor 501. The read control unit 304 reads the descriptor 501 via a bus control unit 302. Upon reading the descriptor 501, the descriptor control unit 303 sequentially acquires the respective lists according to the mode set in the transfer mode 503 of the descriptor 501. It is possible to arbitrarily set according to the transfer mode 503 whether to use each of a transfer source chained list 514, a transfer destination chained list 515, an insertion chained list 516, and a deletion chained list 517.

If the transfer mode 503 is set to use the transfer source chained list 514, the first unit of the list is acquired from the address of a transfer source chained list address 504. Upon completion of transfer processing for the first unit of the list, the next unit is acquired. This processing continues until units, the number of which is equal to a value set in a transfer source chained list unit count 510, are acquired. The transfer source chained list 514 includes units, each of which consists of a transfer source address and a transfer source size. On the other hand, if the transfer mode 503 is set not to use the transfer source chained list 514, a continuous area is read from the transfer source using, as a transfer source address, the address designated in the transfer source chained list address 504.

If the transfer mode 503 is set to use the transfer destination chained list 515, the first unit of the list is acquired from the address of a transfer destination chained list address 505. Upon completion of transfer processing for the first unit of the list, the next unit is acquired. This processing continues until units, the number of which is equal to a value set in a transfer destination chained list unit count 511, are acquired. The transfer destination chained list 515 includes units, each of which consists of a transfer destination address and a transfer destination size. On the other hand, if the transfer mode 503 is set not to use the transfer destination chained list 515, a continuous area is written in the transfer destination using, as a transfer destination address, the address designated in the transfer destination chained list address 505.

If the transfer mode 503 is set to use the insertion chained list 516, the first unit of the list is acquired from the address of an insertion chained list address 506. Upon completion of transfer processing for the first unit of the list, the next unit is acquired. This processing continues until units, the number of which is equal to a value set in an insertion chained list unit count 512, are acquired. The insertion chained list 516 includes units, each of which consists of an insertion source address, an insertion offset, and an insertion size. On the other hand, if the transfer mode 503 is set not to use the insertion chained list 516, the field of the insertion chained list address 506 is ignored and a transfer operation involving insertion of data is not performed.

If the transfer mode 503 is set to use the deletion chained list 517, the first unit of the list is acquired from the address of a deletion chained list address 507. Upon completion of transfer processing for the first unit of the list, the next unit is acquired. This processing continues until units, the number of which is equal to a value set in a deletion chained list unit count 513, are acquired. The deletion chained list 517 includes units, each of which consists of a deletion offset and a deletion size. On the other hand, if the transfer mode 503 is set not to use the deletion chained list 517, the field of the deletion chained list address 507 is ignored and a transfer operation involving deletion of data is not performed.

Instead of acquiring units of each list one by one, a plurality of units may be acquired at once. As a method of counting the insertion offset of the insertion chained list 516 or the deletion offset of the deletion chained list 517, the offset may be counted by including or excluding the insertion size or deletion size. If the offset is counted by including the insertion size or deletion size, it is possible to nest and insert data, for example, to insert the data of the second unit in the data of the first unit of the insertion list. In this case, however, it is necessary to read out and process a plurality of units of the list instead of reading out and processing units one by one.

The descriptor control unit 303 transfers data under the control of a transfer source list control unit 308, a transfer destination list control unit 307, an insertion list control unit 310, and a deletion list control unit 309. The transfer source list control unit 308 reads, via the read control unit 304, data with a designated size from an address indicated in the transfer source chained list 514. When the data size read by the transfer source list control unit 308 reaches an offset designated in the insertion chained list 516, the insertion list control unit 310 reads data with a designated size from a designated address via the read control unit 304. The read data is transferred to the deletion list control unit 309 via the descriptor control unit 303 and a checksum calculation unit 306. The deletion list control unit 309 discards data with a size designated in the deletion chained list 517 from a position at which the transferred data reaches the offset designated in the deletion chained list 517.

Data which is not discarded is transferred to the transfer destination list control unit 307. The checksum calculation unit 306 performs checksum calculation for the transferred data. The transfer destination list control unit 307 writes, through a write control unit 305, data with a designated size at the address indicated in the transfer destination list. When the transferred data size reaches a size set in a transfer size 508 of the descriptor 501, the descriptor control unit 303 terminates the transfer processing. Upon completion of the transfer processing, the checksum calculation result and the status of the transfer result are written in an end status 509.

Data Insertion Processing

Figure 10:
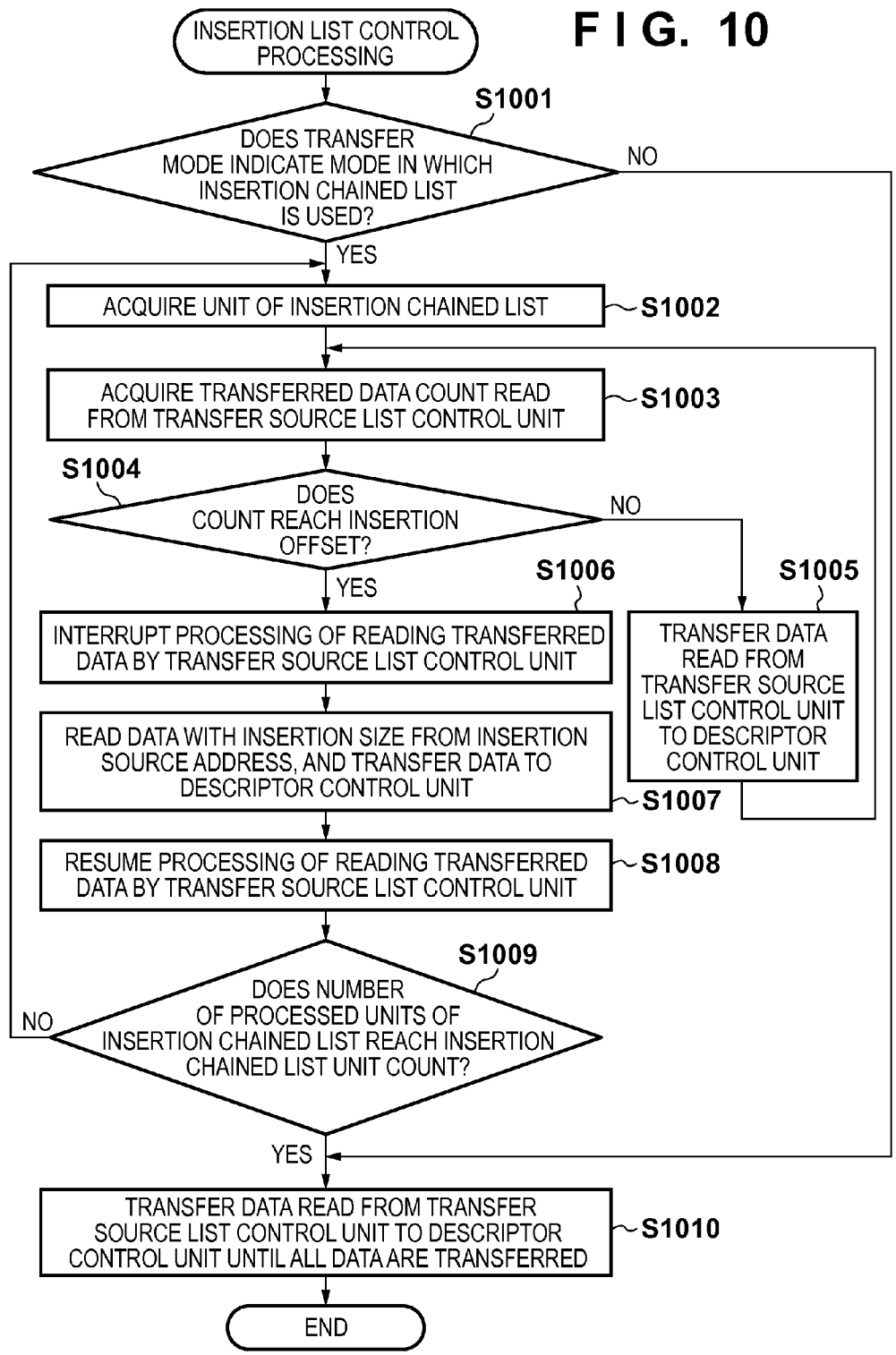
FIG. 10 is a flowchart for explaining insertion list control processing by an insertion list control unit according to the second embodiment.

Data insertion processing (insertion list control processing) by the insertion list control unit 310 will be described. In step S1001 of FIG. 10, it is checked whether the transfer mode 503 set in the descriptor 501 indicates a mode in which the insertion chained list 516 is used. If it is determined that the transfer mode 503 indicates a mode in which the insertion chained list 516 is not used (NO in step S1001), the process advances to step S1010.

If it is determined in step S1001 that the transfer mode 503 indicates a mode in which the insertion chained list 516 is used (YES in step S1001), a unit of the insertion chained list 516 is acquired in step S1002.

In step S1003, the count value of the transferred data read from the transfer source list control unit 308 is acquired.

In step S1004, it is checked whether the count value acquired in step S1003 reaches the insertion offset. If it is determined that the count value does not reach the insertion offset (NO in step S1004), the process advances to step S1005. In step S1005, the data read from the transfer source list control unit 308 is transferred to the descriptor control unit 303. Until the count value reaches the insertion offset, the processing in steps S1003, S1004, and S1005 is repeated.

If it is determined in step S1004 that the count value reaches the insertion offset (YES in step S1004), processing of reading the transferred data by the transfer source list control unit 308 is interrupted in step S1006.

In step S1007, data with the insertion size is read from the insertion source address, and is transferred to the descriptor control unit 303.

Upon completion of the transfer operation of the insertion data with the data size, the processing of reading the transferred data by the transfer source list control unit 308 resumes in step S1008.

In step S1009, it is checked whether the number of processed units of the insertion chained list reaches the value set in the insertion chained list unit count 512. If it is determined that the number of processed units of the insertion chained list does not reach the insertion chained list unit count 512 (NO in step S1009), the process returns to step S1002. The processing in steps S1002 to S1009 is repeated until the number of processed units of the insertion chained list reaches the insertion chained list unit count 512.

In this embodiment, data is inserted in the transfer source chained list and then read processing is executed according to the above-described procedure. Any procedure may be used as long as the integrity is maintained when inserting data while sequentially reading the transfer source chained list and insertion chained list.

If the number of units of the insertion chained list reaches the insertion chained list unit count 512 (YES in step S1009), the process advances to step S1010.

In step S1010, data read from the transfer source list control unit 308 is transferred to the descriptor control unit 303 until all the remaining data are transferred. Upon completion of the transfer operation for all the data, the insertion list control processing ends.

Data Deletion Processing

Data deletion processing (deletion list control processing) by the deletion list control unit 309 will be described. In step S1101 of FIG. 11, it is checked whether the transfer mode 503 set in the descriptor 501 indicates a mode in which the deletion chained list 517 is used. If it is determined that the transfer mode 503 indicates a mode in which the deletion chained list 517 is not used (NO in step S1101), the process advances to step S1108.

If it is determined in step S1101 that the transfer mode 503 indicates a mode in which the deletion chained list 517 is used (YES in step S1101), a unit of the deletion chained list 517 is acquired in step S1102.

In step S1103, the count value of the transferred data read from the descriptor control unit 303 is acquired.

In step S1104, it is checked whether the count value acquired in step S1103 reaches the deletion offset. If it is determined that the count value does not reach the deletion offset (NO in step S1104), the process advances to step S1105. In step S1105, the data read from the descriptor control unit 303 is transferred to the transfer destination list control unit 307. Until the count value reaches the deletion offset (YES in step S1104), the processing in steps S1103, S1104, and S1105 is repeated.

In step S1106, data with a deletion size is discarded without transferring to the transfer destination list control unit 307.

In step S1107, it is checked whether the number of processed units of the deletion chained list reaches the value set in the deletion chained list unit count 513. If it is determined that the number of processed units of the deletion chained list does not reach the deletion chained list unit count 513 (NO in step S1107), the process returns to step S1102. The processing in steps S1102 to S1107 is repeated until the number of processed units of the deletion chained list reaches the deletion chained list unit count 513 (YES in step S1107).

If it is determined in step S1107 that the processing of the deletion chained list is complete, in step S1108 data read from the descriptor control unit 303 is transferred to the transfer destination list control unit 307 until all the remaining data are transferred. Upon completion of the transfer operation for all the data, the deletion list control processing ends.

In this embodiment, data is transferred to the transfer destination chained list while deleting some of the read data according to the above-described procedure. Any procedure may be used as long as the integrity is maintained when deleting some data while sequentially reading the transfer destination chained list and deletion chained list.

According to this embodiment, the insertion chained list enables the insertion list control unit to read transfer source data while inserting data in the transfer source chained list. Furthermore, the deletion chained list enables the deletion list control unit to transfer data while deleting some data from the transfer destination chained list.

The data path control unit can execute data transfer processing while inserting or deleting data at an arbitrary position without the intervention of the processor. This allows data transfer while inserting or deleting data at an arbitrary position in DMA transfer using chained lists.

It is possible to perform a transfer operation without the intervention of a processor during DMA processing, thereby reducing the load on the processor. Since a chained list created in advance can be used intact, it is possible to reduce the load of the pre-processing of DMA transfer, which is executed by the processor, such as addition, modification, and making a copy of the chained list. It is also possible to arbitrarily combine chained lists to be used according to a transfer mode, thereby allowing general-purpose use. It is not necessary to hold a reconstructed chained list in the data path control unit since insertion or deletion processing is executed while sequentially reading data, thereby allowing on-chip memory reduction.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-232119, filed Oct. 21, 2011, which is hereby incorporated by reference herein in its entirety.

What is claimed is:

1. A data transfer apparatus comprising:
an acquisition unit configured to acquire, from another apparatus, a first list indicating arrangement information of transfer source data, a second list indicating arrangement information of transfer destination data, a third list indicating arrangement information of data to be inserted, and a fourth list which includes a deletion offset address indicating a deletion start position and a data size of data to be deleted;
a selection unit configured to select a necessary list from the first to fourth lists acquired by said acquisition unit based on a request from said another apparatus;
a control unit configured to generate data to be transferred from a transfer source to a transfer destination using the selected list by the selection unit; and
a transfer unit configured to transfer the data generated by said control unit to the transfer destination.

2. The apparatus according to claim 1, wherein said control unit generates the data by reading data arranged in an address area of the transfer source according to the arrangement information of the first list, and writing the data in an address area of the transfer destination according to the arrangement information of the second list.

3. The apparatus according to claim 2, wherein when a received transfer request contains data update designation, said control unit generates data by reconstructing the arrangement information of the first list according to contents of the update designation.

4. The apparatus according to claim 3, wherein when the update designation designates to insert data, said control unit specifies a data insertion position in the first list using an insertion offset address indicating an insertion start position and included in the third list.

5. The apparatus according to claim 1, wherein
the first list includes units, each of which consists of a physically discontinuous address area where the transfer source data is arranged, and a data size of the data read from the address area, and
the second list includes units, each of which consists of a physically discontinuous address area of the transfer destination where the data is arranged, and a data size of the data written from the address area.

6. The apparatus according to claim 4, wherein the third list includes units, each of which consists of an address at which insertion source data is arranged, a data size of the insertion source data read from the address, and the insertion offset address indicating the insertion start position.

7. The apparatus according to claim 6, wherein said control unit reconstructs the arrangement information of the first list by setting an address in the third list at an insertion position in the first list.

8. The apparatus according to claim 6, wherein when an address of data read by said control unit reaches the insertion offset address, said control unit interrupts a data read operation according to the first list, and reads insertion data according to an address of the third list.

9. The apparatus according to claim 8, wherein upon completion of transfer of insertion data with a data size according to the third list, said control unit resumes the data read operation according to the first list, which has been interrupted.

10. The apparatus according to claim 3, wherein when the update designation designates to delete data, said control unit specifies a data deletion position in the first list using the deletion offset address.

11. The apparatus according to claim 10, wherein said control unit reconstructs the arrangement information of the first list by modifying a data size of the first list using the data size of the data to be deleted.

12. The apparatus according to claim 10, wherein when an address of data read by said control unit reaches the deletion offset address, said control unit does not generate data with a data size of the fourth list.

13. A data transfer method for a data transfer apparatus, comprising:
   an acquisition step of acquiring, from another apparatus, a first list indicating arrangement information of transfer source data, a second list indicating arrangement information of transfer destination data, a third list indicating arrangement information of data to be inserted, and a fourth list which includes a deletion offset address indicating a deletion start position and a data size of data to be deleted;
   a selection step of selecting a necessary list from the first to fourth lists acquired in the acquisition step based on a request from the another apparatus;
   a control step of generating data to be transferred from a transfer source to a transfer destination using the selected list in the selection step; and
   a transfer step of transferring the data generated in the control step to the transfer destination.

14. A non-transitory computer readable storage medium storing a program for causing a computer to execute a data transfer method comprising:
   an acquisition step of acquiring, from another apparatus, a first list indicating arrangement information of transfer source data, a second list indicating arrangement information of transfer destination data, a third list indicating arrangement information of data to be inserted, and a fourth list which includes a deletion offset address indicating a deletion start position and a data size of data to be deleted;
   a selection step of selecting a necessary list from the first to fourth lists acquired in the acquisition step based on a request from the another apparatus;
   a control step of generating data to be transferred from a transfer source to a transfer destination using the selected list in the selection step; and
   a transfer step of transferring the data generated in the control step to the transfer destination.

* * * * *